(12) United States Patent
Yamamoto et al.

(10) Patent No.: US 12,379,334 B2
(45) Date of Patent: Aug. 5, 2025

(54) INSPECTION DEVICE

(71) Applicant: SAKI CORPORATION, Tokyo (JP)

(72) Inventors: Yosuke Yamamoto, Tokyo (JP); Atsushi Kitabatake, Tokyo (JP)

(73) Assignee: SAKI CORPORATION, Tokyo (JP)

( * ) Notice: Subject to any disclaimer, the term of this patent is extended or adjusted under 35 U.S.C. 154(b) by 299 days.

(21) Appl. No.: 17/916,030

(22) PCT Filed: Apr. 1, 2021

(86) PCT No.: PCT/JP2021/014135
§ 371 (c)(1),
(2) Date: Sep. 30, 2022

(87) PCT Pub. No.: WO2021/201211
PCT Pub. Date: Oct. 7, 2021

(65) Prior Publication Data
US 2023/0160841 A1 May 25, 2023

(30) Foreign Application Priority Data
Apr. 2, 2020 (JP) ................... 2020-066589

(51) Int. Cl.
G01N 23/06 (2018.01)
G01N 23/04 (2018.01)

(52) U.S. Cl.
CPC ............ G01N 23/06 (2013.01); G01N 23/04 (2013.01)

(58) Field of Classification Search
CPC ........ G01N 23/04; G01N 23/06; G01N 23/18; G01N 23/044; G01N 2223/306; G01N 2223/32; G01N 2223/648; G01N 2223/419; G01N 2223/645; G01N 2223/629; G01N 2223/305; G01N 2223/3303; G01N 2223/6113; G01N 23/043; G01N 23/083; G01N 2223/3307; G01N 2223/6116; G01N 23/046; G01N 2223/04; G01N 2223/1016; G01N 2223/646; G01N 2223/6462; G01T 1/02; G01T 1/2985; G01T 1/24;
(Continued)

(56) References Cited

U.S. PATENT DOCUMENTS 6,137,860 A * 10/2000 Ellegood ................... B24B 7/06
228/104
9,279,901 B2 * 3/2016 Akery ....................... G01V 5/22
(Continued)

FOREIGN PATENT DOCUMENTS

CN 107941826 A 4/2018
JP 2002350367 A * 12/2002
(Continued)

Primary Examiner — Irakli Kiknadze
(74) Attorney, Agent, or Firm — HAUPTMAN HAM, LLP

(57) ABSTRACT

In an inspection device having a storage unit and an exposure dose calculation unit, the exposure dose calculation unit executes a first step for calculating the dose when an image is acquired by irradiating radiation from a radiation generator based on the reference dose stored in the storage unit, a second step for calculating the dose when the relative position between the radiation generator and an inspection object is changed, a third step for calculating the total value of the dose irradiated to the inspection object, and a fourth step for outputting the total value.

15 Claims, 13 Drawing Sheets

(58) Field of Classification Search
CPC ... A61B 6/4007; A61B 6/4233; A61B 6/4078; A61B 6/032; A61B 6/4014; A61B 6/4275; G01V 5/22; G01V 5/226; G01V 5/0016; G01V 5/005; G01V 5/232; G01V 5/0066; H05H 9/00
USPC .............................................. 378/51, 62, 57
See application file for complete search history.

(56) References Cited

U.S. PATENT DOCUMENTS

| | | | |
|---|---|---|---|
| 9,448,325 B2* | 9/2016 | Chen | A61B 6/4007 |
| 2003/0043964 A1* | 3/2003 | Sorenson | G01N 23/04 |
| | | | 378/58 |
| 2005/0105682 A1 | 5/2005 | Heumann et al. | |
| 2012/0148019 A1* | 6/2012 | Johnson | G01V 5/22 |
| | | | 378/57 |
| 2018/0252656 A1 | 9/2018 | Kambe | |

FOREIGN PATENT DOCUMENTS

| | | |
|---|---|---|
| JP | 200826334 A | 2/2008 |
| JP | 2011179936 A | 9/2011 |
| JP | 2012163352 A | 8/2012 |
| JP | 2018146390 A | 9/2018 |

* cited by examiner

[Fig. 1]
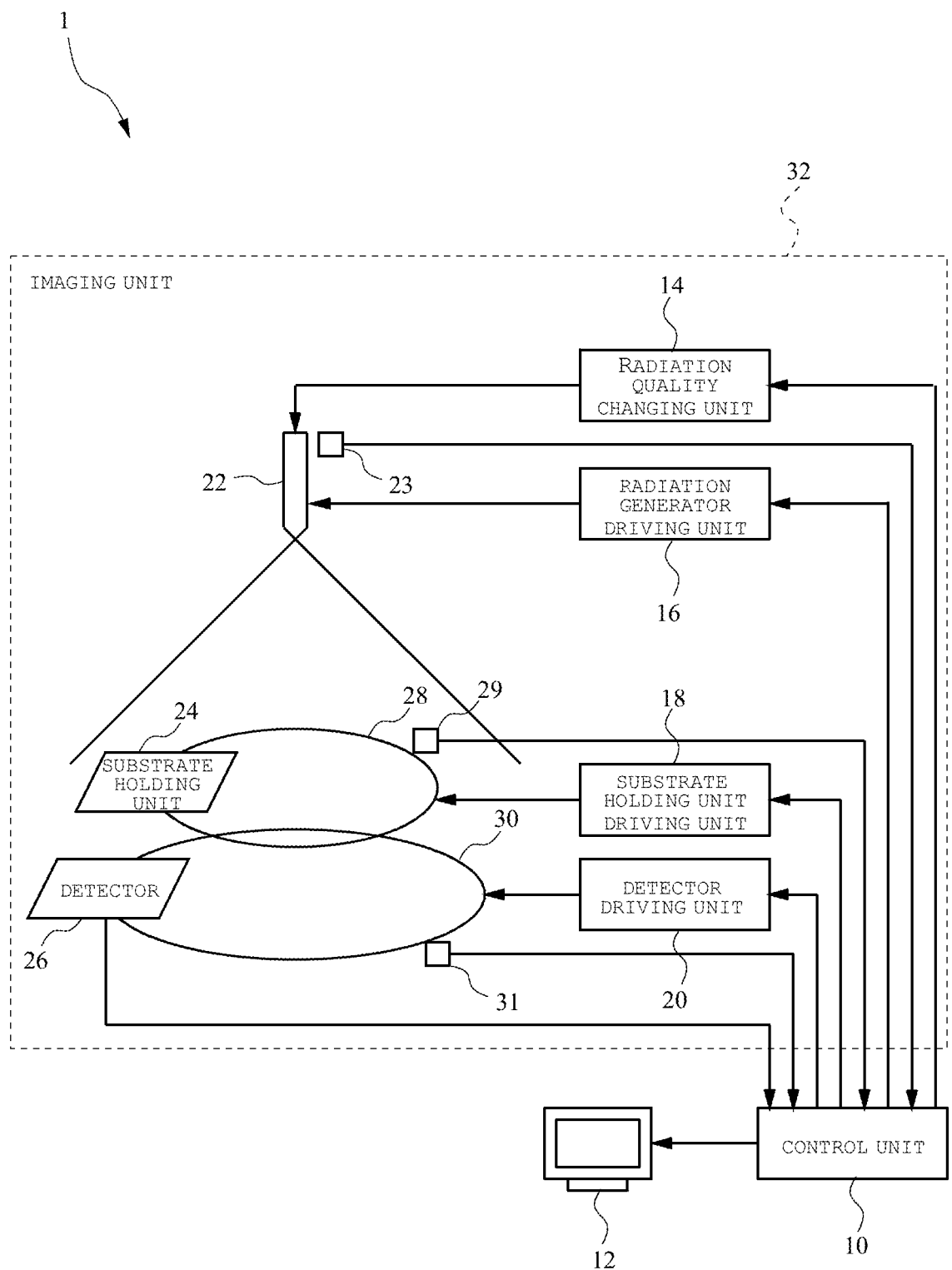

[Fig. 2]
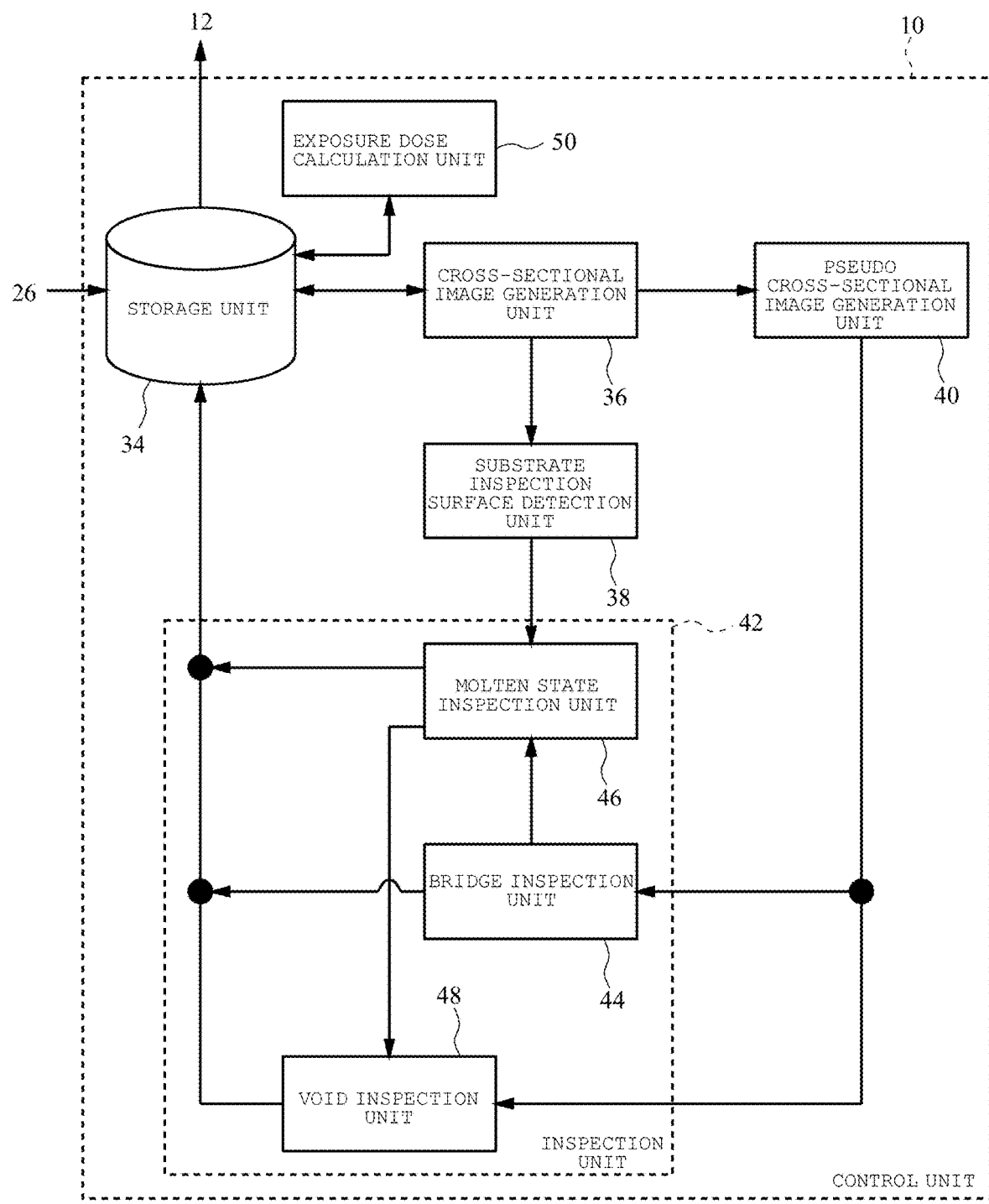

[Fig. 3]
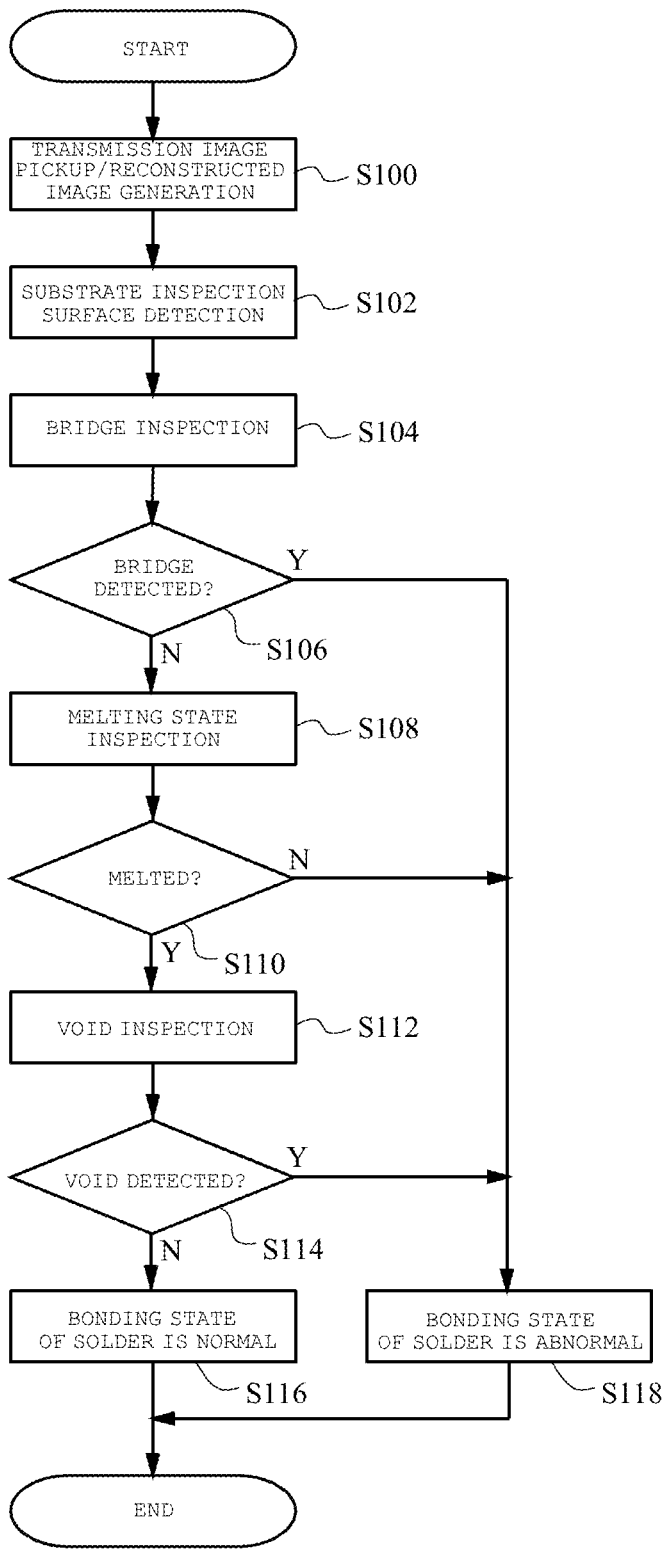

[Fig. 4]
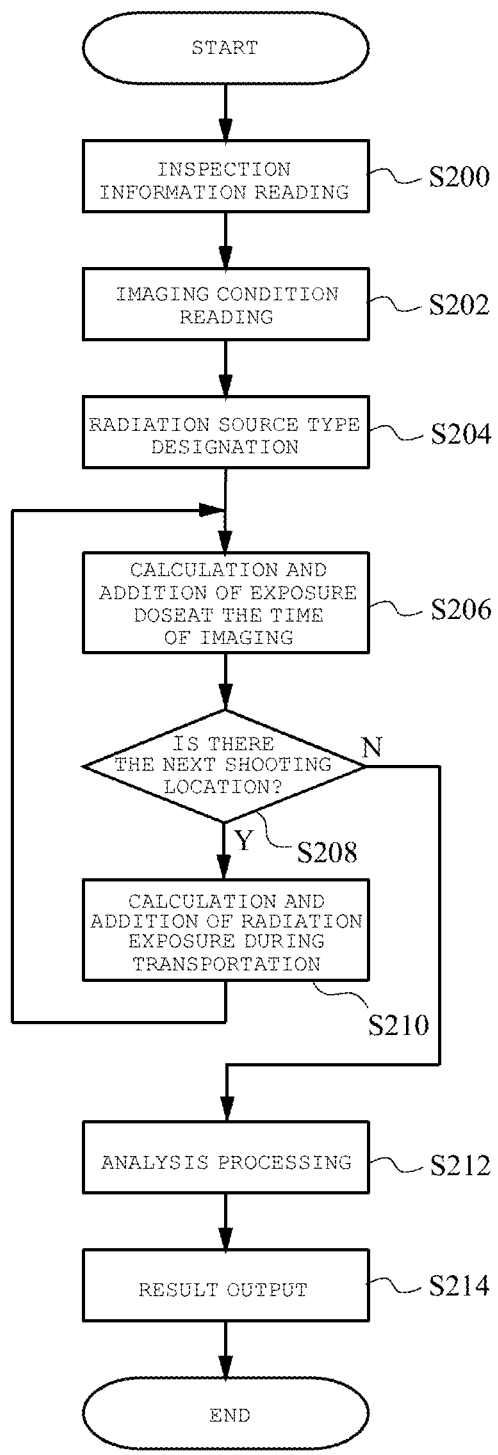

FIG. 6A
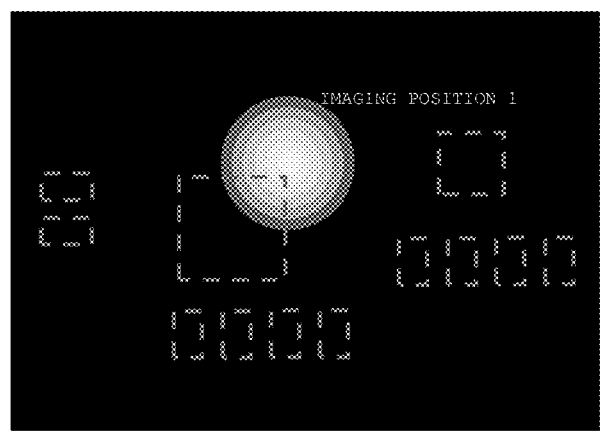
FIG. 6B        FIG. 6C
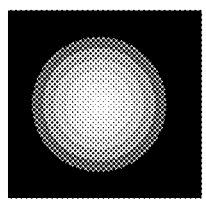  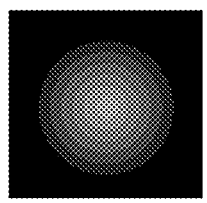

[Fig. 8]
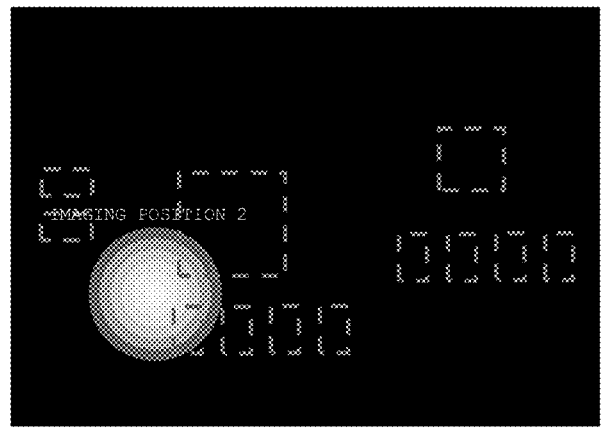

[Fig. 10]
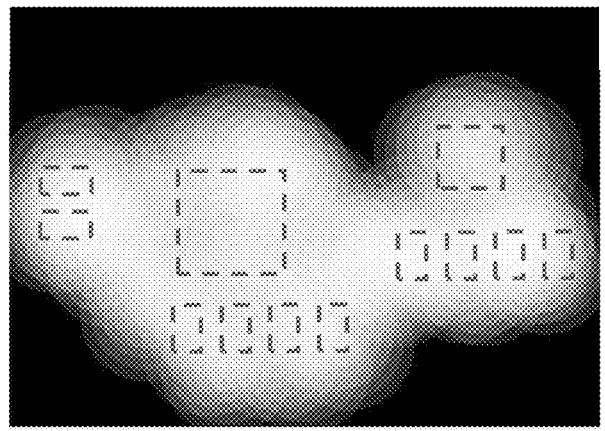

[Fig. 13]
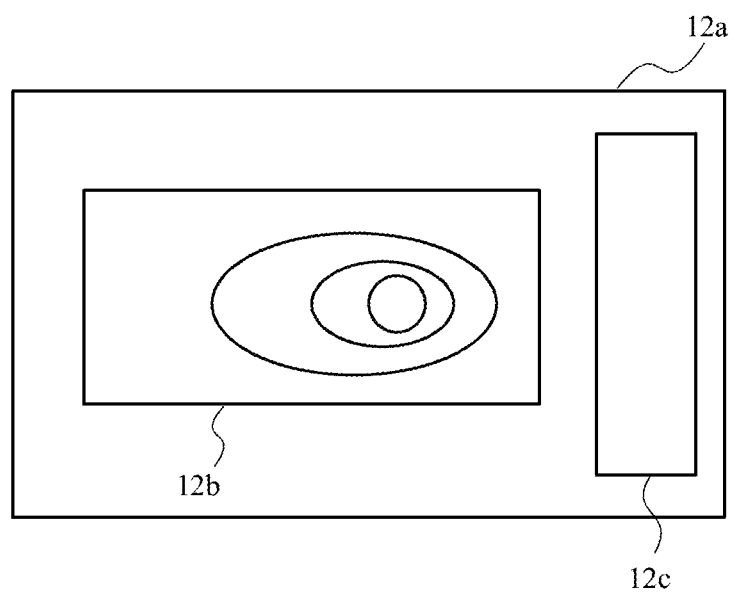

INSPECTION DEVICE

RELATED APPLICATIONS

The present application is a National Phase of International Application No. PCT/JP2021/014135, filed Apr. 1, 2021, and claims priority based on Japanese Patent Application No. 2020-066589, filed Apr. 2, 2020.

TECHNICAL FIELD

The present invention relates to an inspection device.

BACKGROUND ART

As an inspection device for measuring a solder shape on a front surface or a back surface of a substrate, there is a tomosynthesis X-ray inspection device (see Patent Literature 1).

CITATION LIST

Patent Literature

Patent Literature 1: Japanese Patent Application Laid-Open No. 2008-026334

SUMMARY OF INVENTION

Technical Problem

In such an inspection device, an inspection object is irradiated with X-rays, but there is a problem in that the dose of X-rays irradiated to the inspection object cannot be known at the time of inspection unless the exposure dose is measured using a dosimeter.

The present invention has been made in view of such a problem, and an object thereof is to provide an inspection device capable of estimating a dose applied to an inspection object at the time of inspection without measuring an exposure dose using a dosimeter by applying radiation such as X-rays.

Solution to Problem

In order to solve the problem, an inspection device is an inspection device for changing the relative position of a radiation source and an inspection object, irradiating the inspection object with radiation from the radiation source, acquiring an image of the inspection object, and inspecting the inspection object, wherein the inspection device has a storage unit for storing, as a reference dose, the dose from the radiation source irradiated at a predetermined position with respect to the radiation source, and a calculation unit for calculating the dose irradiated to the inspection object in the inspection, wherein the calculation unit executes: a first step for calculating the dose irradiated to the inspection object from the relative position between the radiation source and the inspection object while acquiring the image while fixing or changing the relative position between the radiation source and the inspection object based on the reference dose stored in the storage unit; a second step for calculating the dose irradiated to the inspection object from the relative position between the radiation source and the inspection object while changing the relative position between the radiation source and the inspection object based on the reference dose stored in the storage unit; a third step for calculating the total value of the dose irradiated to the inspection object from the total of the dose calculated in the first step and the dose calculated in the second step; and a fourth step for outputting the total value calculated in the third step.

Advantageous Effects of Invention

According to the inspection device of the present invention, it is possible to estimate a dose applied to an inspection object at the time of inspection without irradiating radiation such as X-rays.

BRIEF DESCRIPTION OF DRAWINGS

FIG. 1 is an explanatory diagram for explaining a configuration of an inspection device according to an embodiment.

FIG. 2 is an explanatory diagram for explaining functional blocks processed by a control unit of the inspection device.

FIG. 3 is a flowchart for explaining the flow of inspection.

FIG. 4 is a flowchart for explaining the flow of exposure dose calculation processing.

FIG. 5A shows a transmission type X-ray source, and FIG. 5B shows a reflection type X-ray source.

FIGS. 6A to 6C are explanatory diagrams for explaining the distribution of the exposure dose: FIG. 6A shows the distribution of the exposure dose at the imaging position 1, FIG. 6B shows the exposure dose at the time of stopping, and FIG. 6C shows the exposure dose at the time of moving.

FIGS. 7A to 7C show the exposure dose at each position within the movement range.

FIG. 8 is an explanatory diagram for explaining a distribution of an exposure dose at an imaging position 2.

FIG. 9A shows a case where radiation is always generated from the radiation generator, and FIG. 9B shows a case where radiation is generated from the radiation generator only at the imaging position.

FIG. 10 is an explanatory diagram for explaining the distribution of the total exposure dose when the entire inspection target region is imaged.

FIG. 11A shows a case where radiation is always generated from a radiation generator, and FIG. 11B shows a case where radiation is generated from a radiation generator only at an imaging position.

FIG. 12A shows a case where there is no filter, and FIG. 12B shows a case where there is a filter.

FIG. 13 is an explanatory diagram showing an output example of the calculated exposure dose.

DESCRIPTION OF EMBODIMENTS

Figure 5A:
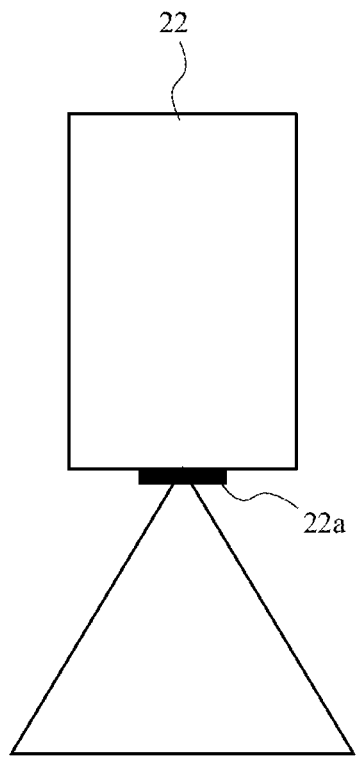
FIGS. 5A and 5B are explanatory views for explaining types of radiation generators (radiation sources)

Preferred embodiments of the invention will now be described with reference to the drawings. As shown in FIG.

1, the inspection device 1 according to the present embodiment includes a control unit 10 configured by a processing device such as a personal computer (PC), a monitor 12, and an imaging unit 32. The imaging unit 32 further includes a radiation quality changing unit 14, a radiation generator driving unit 16, a substrate holding unit driving unit 18, a detector driving unit 20, a radiation generator 22, a substrate holding unit 24, and a detector 26.

The radiation generator 22 is a device (radiation source) that generates radiation such as X-rays, and generates radiation by causing accelerated electrons to collide with a target such as tungsten or diamond, for example. The radiation in this embodiment will be described in the case of X-rays, but is not limited thereto. For example, the radiation may be alpha radiation, beta radiation, gamma radiation, ultraviolet radiation, visible radiation, or infrared radiation. The radiation may be a microwave or a terahertz wave.

The substrate holding unit 24 holds a substrate which is an inspection object. A substrate held by a substrate holding unit 24 is irradiated with radiation generated by a radiation generator 22, and the radiation transmitted through the substrate is imaged as an image by a detector 26. Hereinafter, the radiation transmission image of the substrate imaged by the detector 26 is referred to as a "transmission image". As will be described later, in the present embodiment, the substrate holding unit 24 holding the substrate and the detector 26 are moved relative to the radiation generator 22 to acquire a plurality of transmission images, thereby generating a reconstructed image.

The transmission image captured by the detector 26 is sent to the control unit 10 and reconstructed into an image including the three-dimensional shape of the solder of the joint portion using a known technique such as a filtered-back projection method (FBP method). The reconstructed image and the transmission image are stored in a storage in the control unit 10 or an external storage (not illustrated). Hereinafter, an image reconstructed into a three-dimensional image including the three-dimensional shape of the solder of the joint portion based on the transmission image is referred to as a "reconstructed image". An image obtained by cutting out an arbitrary cross section from the reconstructed image is referred to as a "cross-sectional image". Such reconstructed images and cross-sectional images are output to the monitor 12. The monitor 12 displays not only the reconstructed image and the cross-sectional image, but also an inspection result of a bonding state of solder, which will be described later, and the like. The reconstructed image in the present embodiment is also referred to as "planar CT" because it is reconstructed from a planar image captured by the detector 26 as described above.

The radiation quality changing unit 14 changes the radiation quality of the radiation generated by the radiation generator 22. The radiation quality of radiation is determined by a voltage (hereinafter referred to as a "tube voltage") applied to accelerate electrons to collide with a target, and a current (hereinafter referred to as a "tube current") that determines the number of electrons. The radiation quality changing unit 14 is a device that controls the tube voltage and the tube current. The radiation quality changing unit 14 can be realized by using a known technique such as a transformer or a rectifier.

Here, the radiation quality of the radiation is determined by the brightness and hardness of the radiation (spectral distribution of the radiation). When the tube current is increased, the number of electrons colliding with the target increases, and the number of photons of radiation generated also increases. As a result, the brightness of the radiation increases. For example, some components such as capacitors are thicker than other components, and it is necessary to irradiate high-intensity radiation in order to capture a transmission image of these components. In such a case, the luminance of the radiation is adjusted by adjusting the tube current. Further, when the tube voltage is increased, the energy of the electrons colliding with the target increases, and the energy (spectrum) of the generated radiation increases. In general, as the energy of radiation increases, the penetration force of a substance increases and the radiation is less likely to be absorbed by the substance. A transmission image captured using such radiation has a low contrast. Therefore, the tube voltage can be used to adjust the contrast of the transmission image.

The radiation generator driving unit 16 has a drive mechanism such as a motor (not shown), and can move the radiation generator 22 up and down along an axis passing through the focal point of the radiation generator 22 (the direction of this axis is referred to as the "Z-axis direction"). This makes it possible to change the irradiation field by changing the distance between the radiation generator 22 and the inspection object (substrate) held by the substrate holding unit 24, and to change the magnification ratio of the transmission image captured by the detector 26. The position of the radiation generator 22 in the Z-axis direction is detected by a generator position detection unit 23 and output to the control unit 10.

The detector driving unit 20 also has a drive mechanism such as a motor (not shown), and rotationally moves the detector 26 along a detector rotation trajectory 30. The substrate holding unit driving unit 18 also has a driving mechanism such as a motor (not shown), and moves the substrate holding unit 24 in parallel on the plane on which the substrate rotation trajectory 28 is provided. Further, the substrate holding unit 24 is configured to rotationally move on the substrate rotation trajectory 28 in conjunction with the rotational movement of the detector 26. This makes it possible to capture a plurality of transmission images having different projection directions and projection angles while changing the relative positional relationship between the radiation generator 22 and the substrate held by the substrate holding unit 24.

Here, the rotation radius of the substrate rotation trajectory 28 and the detector rotation trajectory 30 is not fixed, but can be freely changed. This makes it possible to arbitrarily change the irradiation angle of the radiation with which the component disposed on the substrate is irradiated. It should be noted that the trajectory surfaces of the substrate rotation trajectory 28 and the detector rotation trajectory 30 are perpendicular to the above-described Z-axis direction, and that the directions perpendicular to these trajectory surfaces are defined as the X-axis direction and the Y-axis direction, the positions of the substrate holding unit 24 in the X-axis direction and the Y-axis direction are detected by the substrate position detection unit 29 and output to the control unit 10, and the positions of the detector 26 in the X-axis direction and the Y-axis direction are detected by the detector position detection unit 31 and output to the control unit 10.

The control unit 10 controls all operations of the inspection device 1 described above. Hereinafter, various functions of the control unit 10 will be described with reference to FIG. 2. Although not shown, input devices such as a keyboard and a mouse are connected to the control unit 10.

The control unit 10 includes a storage unit 34, a cross-sectional image generation unit 36, a substrate inspection surface detection unit 38, a pseudo cross-sectional image generation unit 40, and an inspection unit 42. Although not illustrated, the control unit 10 also includes an imaging control unit that controls operations of the radiation quality changing unit 14, the radiation generator driving unit 16, the substrate holding unit driving unit 18, and the detector driving unit 20. In addition, each of these functional blocks is realized by cooperation of hardware such as a CPU that executes various arithmetic processing and a RAM that is used as a work area for storing data and executing programs, and software. Therefore, these functional blocks can be realized in various forms by a combination of hardware and software.

The storage unit 34 stores information such as an imaging condition for imaging a transmission image of the substrate and a design of the substrate which is an inspection object. The storage unit 34 also stores a transmission image or a reconstructed image (a cross-sectional image or a pseudo cross-sectional image) of the substrate, an inspection result of an inspection unit 42 to be described later, and the like. The storage unit 34 further stores a speed at which the radiation generator driving unit 16 drives the radiation generator 22, a speed at which the substrate holding unit driving unit 18 drives the substrate holding unit 24, and a speed at which the detector driving unit 20 drives the detector 26.

The cross-sectional image generation unit 36 generates a cross-sectional image based on the plurality of transmission images acquired from the storage unit 34. This can be realized by using a known technique such as an FBP method or a maximum likelihood estimation method. When the reconstruction algorithm is different, the property of the obtained reconstructed image and the time required for reconstruction are also different. Therefore, a configuration may be adopted in which a plurality of reconstruction algorithms and parameters used in the algorithms are prepared in advance and the user is allowed to select one of them. As a result, it is possible to provide the user with a degree of freedom in selection such as giving priority to shortening of the time required for reconstruction or giving priority to good image quality even if it takes time. The generated cross-sectional image is output to the storage unit 34 and recorded in the storage unit 34.

The substrate inspection surface detection unit 38 specifies a position (cross-sectional image) where a surface to be inspected on the substrate (for example, the surface of the substrate) is projected from the plurality of cross-sectional images generated by the cross-sectional image generation unit 36. Hereinafter, the cross-sectional image showing the inspection surface of the substrate is referred to as an "inspection surface image". A method of detecting the inspection surface image will be described in detail later.

Regarding the cross-sectional images generated by the cross-sectional image generation unit 36, the pseudo cross-sectional image generation unit 40 generates an image of a region of the substrate that is thicker than the cross-sectional images by stacking a predetermined number of continuous cross-sectional images. The number of cross-sectional images to be stacked is determined by the thickness of the region of the substrate on which the cross-sectional image is projected (hereinafter referred to as "slice thickness") and the slice thickness of the pseudo cross-sectional image. For example, when the slice thickness of the cross-sectional image is 50 μm and the height (for example, 500 μm) of a solder ball (hereinafter, simply referred to as "solder") of BGA is used as the slice thickness as the pseudo cross-sectional image, 500/50=10 cross-sectional images may be stacked. At this time, in order to specify the position of the solder, the inspection surface image specified by the substrate inspection surface detection unit 38 is used.

The inspection unit 42 inspects the joint state of the solder based on the cross-sectional image generated by the cross-sectional image generation unit 36, the inspection surface image specified by the substrate inspection surface detection unit 38, and the pseudo cross-sectional image generated by the pseudo cross-sectional image generation unit 40. Since the solder that joins the substrate and the component is present in the vicinity of the substrate inspection surface, it is possible to determine whether or not the solder joins the substrate and the component appropriately by inspecting the inspection surface image and the cross-sectional image showing the region on the radiation generator 22 side with respect to the inspection surface image.

As used herein, "solder joint state" refers to whether or not a substrate and a component are joined by solder to create an appropriate conductive path. The inspection of the bonding state of the solder includes a bridge inspection, a melting state inspection, and a void inspection. "Bridge" refers to an undesirable conductive path between conductors caused by solder joining. In addition, the "melting state" refers to a state of whether or not bonding between the substrate and the component is insufficient due to insufficient melting of the solder, that is, a state of whether or not so-called "floating" occurs. "Void" refers to a failure of a solder joint due to air bubbles in the solder joint. Accordingly, the inspection unit 42 includes a bridge inspection unit 44, a melting state inspection unit 46, and a void inspection unit 48.

Although the details of the operations of the bridge inspection unit 44, the melting state inspection unit 46, and the void inspection unit 48 will be described later, the bridge inspection unit 44 and the void inspection unit 48 inspect bridges and voids, respectively, based on the pseudo cross-sectional image generated by the pseudo cross-sectional image generation unit 40, and the melting state inspection unit 46 inspects the melting state of the solder based on the inspection surface image identified by the substrate inspection surface detection unit 38. The inspection results of the bridge inspection unit 44, the melting state inspection unit 46, and the void inspection unit 48 are recorded in the storage unit 34.

FIG. 3 is a flow chart illustrating a flow from capturing a transmission image, generating a reconstructed image, and identifying an inspection surface image to inspecting a solder joint state. The processing in this flowchart is started, for example, when the control unit 10 receives an instruction to start inspection from an input device (not illustrated).

As described above, the control unit 10 sets the irradiation field of the X-ray emitted from the radiation generator 22 by the radiation generator driving unit 16, moves the substrate holding unit 24 by the substrate holding unit driving unit 18, moves the detector 26 by the detector driving unit 20 to change the imaging position, sets the radiation quality of the radiation generator 22 by the radiation quality changing unit 14, irradiates the substrate with the radiation, and captures a transmission image, and further generates a reconstructed image by the cross-sectional image generation unit 36 and the pseudo-cross-sectional image generation unit 40 from the plurality of transmission images thus captured (step S100).

Next, the substrate inspection surface detection unit 38 of the control unit 10 receives the transmission image or the reconstructed image (cross-sectional image) from the cross-sectional image generation unit 36, and specifies an inspection surface image therefrom (step S102) The bridge inspection unit 44 acquires a pseudo cross-sectional image having a slice thickness similar to that of the solder ball, which reflects the solder ball, from the pseudo cross-sectional image generation unit 40, and inspects the presence or absence of a bridge (step S104). If a bridge is not detected ("N" in step S106), the melting state inspection unit 46 acquires an inspection surface image from the substrate inspection surface detection unit 38 to inspect whether or not the solder is melted (step S108). If the solder is melted ("Y" in step S110), the void inspection unit 48 acquires a pseudo cross-sectional image partially projecting the solder ball from the pseudo cross-sectional image generation unit 40 to inspect whether or not a void exists (step S112). If no void is found ("N" in step S114), the void inspection unit 48 determines that the bonding state of the solder is normal (step S116), and outputs the result to the storage unit 34. If a bridge is detected ("Y" in step S106), if the solder is not melted ("N" in step S110), or if a void exists ("Y" in step S114), the bridge inspection unit 44, the melting state inspection unit 46, and the void inspection unit 48 determine that the bonding state of the solder is abnormal (step S118), and outputs the result to the storage unit 34. When the state of the solder is output to the storage unit 34, the process in this flowchart ends.

The addition, the control unit 10 of the inspection device 1 includes an exposure dose calculation unit 50 that calculates the amount (dose or exposure dose) of radiation (X-rays) with which an inspection object (substrate) is irradiated at the time of inspection by calculation. The exposure dose calculation unit 50 calculates the exposure dose by simulating the action of the inspection device 1 (relative movement of the substrate holding unit 24 with respect to the radiation generator 22) using a personal computer (PC) or the control unit 10 which is a device incorporating some arithmetic mechanism without actually performing exposure dose measurement using a dosimeter in the X-ray inspection of an inspection object such as an electronic substrate or an electronic component.

The exposure dose calculation unit 50 calculates an exposure dose of the inspection object placed on the substrate holding unit 24 based on information about the radiation generator 22 stored in advance in the storage unit 34. Specifically, a value (reference dose) measured by arranging a dosimeter at a predetermined position directly below the radiation generator 22 (a predetermined position on the axis (Z-axis) passing through the focal point of the radiation generator 22) while setting the tube voltage, tube current, and the like to predetermined values by the radiation quality changing unit 14 is stored in the storage unit 34 in association with the position (coordinates) in the Z-axis direction and the values of the tube voltage, tube current, and the like. For example, the dosimeter is disposed at a predetermined position, the tube voltage is measured at intervals of 10 kV, and the tube current is measured at intervals of 50 μA, and the measured values are stored in the storage unit 34. The dose to be measured in advance may be measured not only directly below the radiation generator 22 but also, for example, at a plurality of points moved in the X-axis and Y-axis directions from a measurement point directly below the radiation generator 22. Information to be measured in advance can be reduced by using plane approximation, linear interpolation, or the like for the relationship between the tube voltage and the tube current and the dose. In addition, since the exposure dose of the inspection object is attenuated in inverse proportion to the square of the distance between the inspection object (substrate holding unit 24) and the radiation generator 22, by obtaining the attenuation amount of the X-ray dose immediately below and around the radiation generator 22 by a calculation formula, the preliminary measurement can be performed only at a predetermined position immediately below the radiation generator 22.

Processing performed by the exposure dose calculation unit 50 will be described with reference to FIGS. 4 to 13. As shown in FIG. 4, when the exposure dose calculation processing is started, the exposure dose calculation unit 50 of the control unit 10 first reads inspection information from the storage unit 34 (step S200). Here, the inspection information includes the size of an inspection object (the size of a substrate), the positions and names of components mounted on the substrate, the sizes of the components, and the like. Next, the exposure dose calculation unit 50 reads the imaging conditions (X-ray imaging conditions at the time of examination) from the storage unit 34 (step S202). Here, the imaging conditions include the tube voltage of the radiation generator 22, the tube current, the exposure time, the magnification (the distance between the radiation generator 22 and the substrate holding unit 24 and the inspector 26), the tilt angle in planar CT (the angle with respect to the axis passing through the focal point of the radiation generator 22), the number of transmission images used for CT calculation, and the like.

Figure 5B:
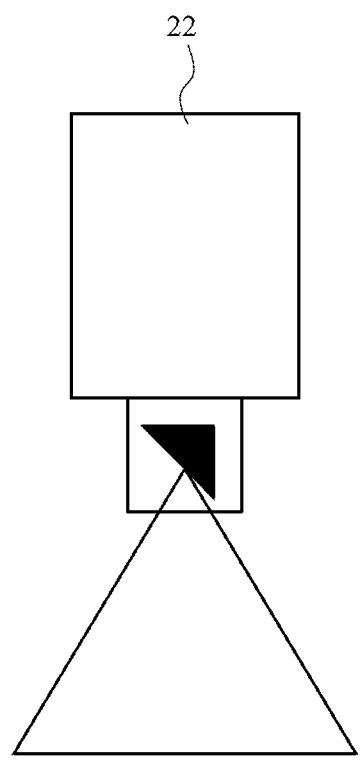

Further, the exposure dose calculation unit 50 acquires the type (radiation source type) of the specified type of the radiation generator 22 (step S204). Here, the radiation source type is information on the type of the X-ray source, which is the radiation generator 22, physical filter attached to the X-ray source, and the radiation source type may be stored in advance in the storage unit 34 and acquired from the storage unit 34, or may be input using an input device such as a keyboard or a mouse (not illustrated) and acquired. For example, the type of the X-ray source is a transmission-type X-ray source in which X-rays are generated by a tungsten target as shown in FIG. 5A and the generated X-rays are transmitted through tungsten as they are, or a reflection-type X-ray source in which X-rays are generated by being reflected by a tungsten target as shown in FIG. 5B, and the type of the filter is information on the material of the filter (for example, zinc) and the thickness in the case of a plate shape (for example, 100 μm or 200 μm). Further, the filter is not limited to a plate type, and may be a bowtie filter, a collimator, or the like having a non-uniform thickness or having holes.

Returning to FIG. 4, as described above, the exposure dose calculator 50 simulates an operation in which imaging is performed by moving the substrate holding unit 24 along the substrate rotation trajectory 28, and calculates the exposure dose at this time. To be specific, the exposure dose calculation unit 50 calculates the exposure dose at the time of capturing one transmission image in the simulation region and adds the exposure dose to the total exposure dose (total value of exposure doses) (step S206), determines whether there is a next imaging location (step S208), and when it is determined that there is a next imaging location (Y in step S208), calculates the exposure dose during movement to the next imaging location and adds the exposure dose to the total exposure dose (step S210), and returns to step S206 to repeat the processing. The exposure dose during movement can be obtained by integrating the exposure dose at a specific position in a short time while advancing the time by a short time. The exposure dose is calculated from the relative position between the radiation generator 22 and the subject, based on the imaging conditions and the reference dose stored in the storage unit 34.

FIG. 6A is a graphical representation of the exposure dose calculated at an imaging position (e.g., imaging position 1) in step S206. The inside of the black rectangle is the outer shape of the inspection object (printed circuit board or the like), and is a target region for calculation of the exposure dose in the exposure dose calculation processing. In addition, a broken-line rectangle indicates an electronic component to be inspected which is mounted on an inspection object, and a concentric circular white region indicates an exposure dose. Here, the larger the exposure dose, the whiter the image.

Here, when the exposure time during imaging is set to 100 ms and the distance on the order of several tens of mm is moved in the order of 100 ms during the movement, the distribution of the exposure dose when imaging is performed while the substrate holding unit 24 and the detector 26 are stopped becomes as shown in FIG. 6B, and the distribution of the exposure dose during the minute time during which the substrate holding unit 24 and the detector 26 are moving becomes as shown in FIG. 6C. In this way, the exposure dose when the substrate holding unit 24 and the detector 26 are moving is less than the exposure dose when the substrate holding unit 24 and the detector 26 are stopped.

Figure 7A:
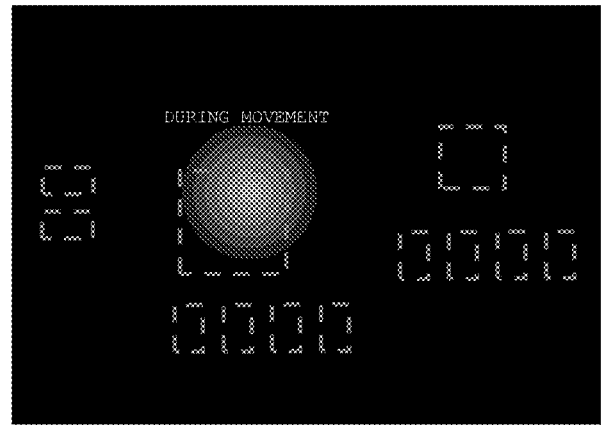
FIGS. 7A to 7C are explanatory diagrams for explaining the distribution of the exposure dose.
Figure 7B:
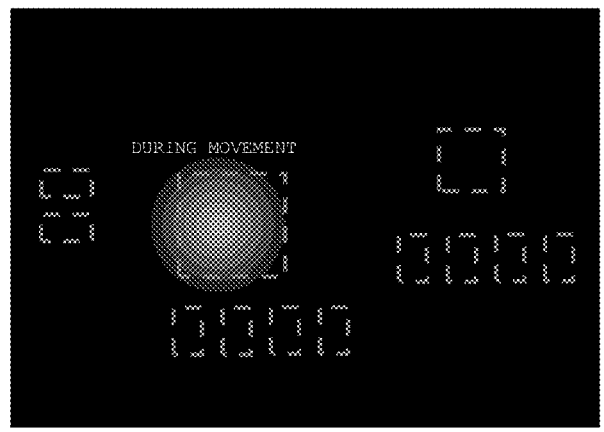
Figure 7C:
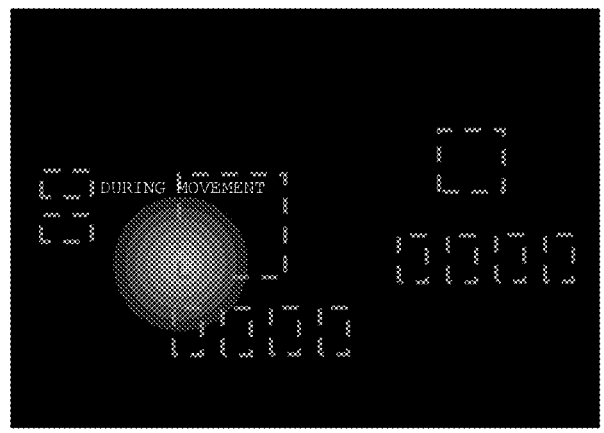

Further, FIGS. 7A to 7C show, as drawings, exposure doses calculated during movement when it is determined in step S208 that there is a next imaging location. As described above, the exposure doses calculated at the moved positions (three positions) at predetermined time intervals (minute time intervals) are shown.

Further, FIG. 8 shows the exposure dose calculated in step S206 at the next imaging position (imaging position 2).

Figure 9A:
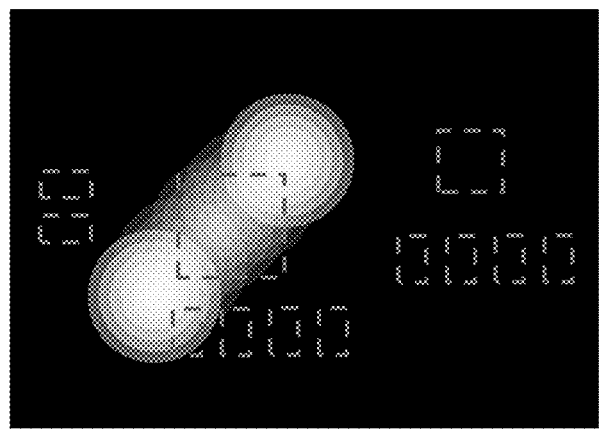
FIGS. 9A and 9B are explanatory diagrams for explaining a distribution of an exposure dose when moving from an imaging position 1 to an imaging position 2.
Figure 9B:
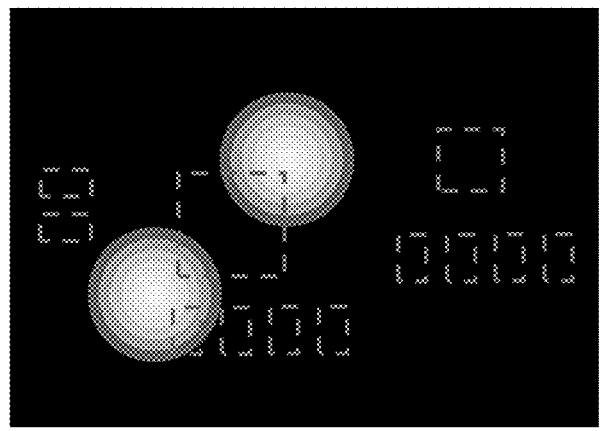

FIG. 9A shows an exposure dose obtained by integrating an exposure dose (FIG. 6A and FIG. 8) at the time of imaging at the above-mentioned two positions (imaging positions 1 and 2) and an exposure dose (FIGS. 7A to 7C) at the time of moving in the case where imaging and movement are repeated in a state where radiation is generated from the radiation generator 22, and the exposure dose (FIGS. 7A to 7C) at the time of moving. The exposure dose at the time of moving when generation of radiation from the radiation generator 22 is stopped (when radiation is generated from the radiation generator 22 only at the imaging position) is as shown in FIG. 9B.

FIG. 10 shows the distribution of the total exposure dose when imaging and moving are repeated in a state where radiation is generated from the radiation generator 22, and all of the inspection target regions are imaged. In this way, by obtaining the total exposure dose during imaging and during movement in one examination, it is possible to obtain the exposure dose not only during imaging but also during movement.

Figure 11A:
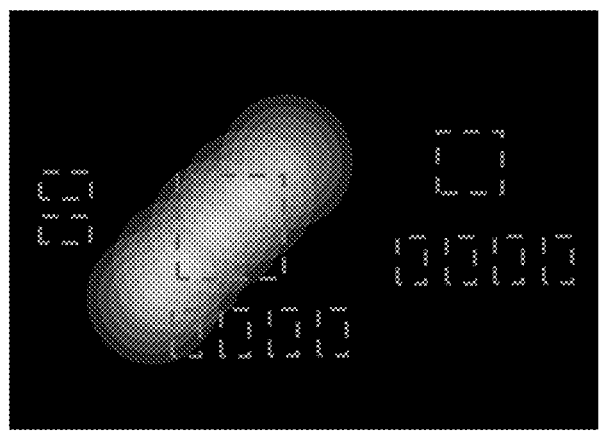
FIGS. 11A and 11B are explanatory diagrams for explaining an exposure dose distribution when imaging is performed while moving a substrate holding unit and a detector.
Figure 11B:
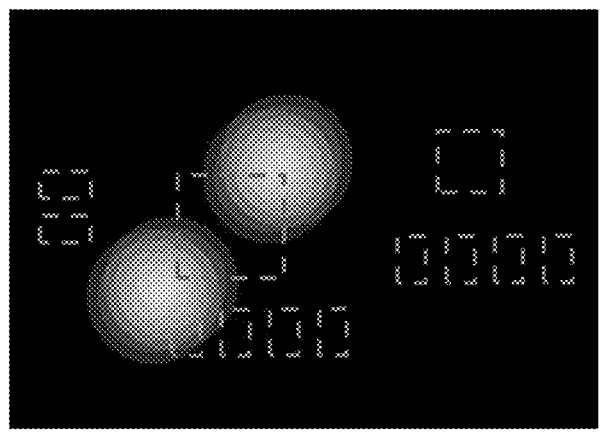

In addition, although the above-described processing has been described based on a configuration in which the substrate holding unit 24 is stopped to perform imaging and is moved to the next imaging position, it is possible to obtain the total exposure dose in a similar method in a case of a configuration in which the substrate holding unit 24 is moved and imaged without being stopped. In this case, as described above, the total exposure dose can be obtained by integrating the exposure dose at a specific position in a short time while advancing the time by a short time. The exposure dose in this case is shown in FIG. 11A. Further, in the case of a configuration in which X-rays are not irradiated from the radiation generator 22 when the substrate holding unit 24 is moving, as shown in FIG. 11B, the exposure dose during movement is 0.

Figure 12A:
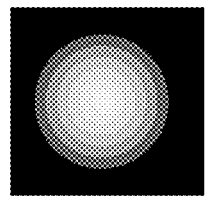
FIGS. 12A and 12B are explanatory views for explaining the exposure dose depending on the presence or absence of a filter.
Figure 12B:
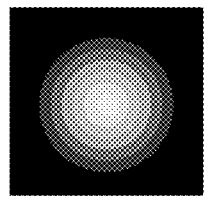

In the calculation of the exposure dose at the time of imaging in step S206 and the calculation of the exposure dose at the time of moving in step S210, non-uniformity or unevenness corresponding to an angle with respect to the radiation generator 22 may be corrected with respect to the exposure dose calculated based on the positions (distances) of the substrate holding unit 24 from the radiation generator 22. For example, as shown in FIG. 5A, when X-rays are transmitted through a plate-shaped filter 22a with a thickness of 100 μm, the passage length is 100 μm with respect to the inspection object immediately below, but the passage length is 141 μm, which is $\sqrt{2}$ times, in the 45° direction, and thus the difference in passage length is corrected. FIG. 12A shows the exposure dose in the case where the filter 22a is not provided. On the other hand, FIG. 12B shows the exposure dose in the case where the filter 22a is arranged. In this way, since the passing distance of the filter becomes longer and the attenuation amount of the X-ray becomes larger toward the outer side, the exposure dose becomes smaller. On the other hand, in the case of a beryllium window having a small amount of X-ray absorption, there is almost no absorption in an oblique direction, so that it is not necessary to perform correction.

In the calculation of the exposure dose in step S206 and step S210, the entire region of the substrate to be simulated (the region of the substrate holding unit 24 on which the substrate is placed) is divided into partial regions of a specific size (for example, 1 mm), and the exposure dose of each partial region is calculated and added to the total exposure dose of each partial region, thereby obtaining the distribution of the total exposure dose on the inspection object.

Returning to FIG. 4, when the exposure dose calculation unit 50 determines that there is no next imaging point (N in step S208), the exposure dose calculation unit 50 performs the above-described analysis processing of the total exposure dose (step S212). For example, when the entire substrate is divided into partial regions as described above and the total exposure dose of each partial region is calculated, the distribution of the exposure dose is obtained. Further, for each component arranged on the substrate, the total exposure dose of the partial regions within the region of the component is obtained, so that the exposure dose (total value) of each component can be obtained. For example, in FIG. 10, the total exposure dose of each component is obtained according to the area of the component and the exposure dose distribution indicated by a broken line.

Finally, the exposure dose calculation unit 50 outputs the analytical result (calculation result) (step S214). The output destination may be the storage unit 34 or the monitor 12. FIG. 13 shows an example in which the analytical results are output to the 12a of the screen of the monitor 12. For example, the entire region of the substrate can be displayed as a region 12b on the screen, and the distribution of the exposure dose can be displayed by contour lines for each predetermined exposure dose. At this time, the most exposed region may be displayed in red, the least exposed region may be displayed in blue, and the other regions may be displayed in other colors. Further, the exposure dose may be displayed as a numerical value.

When the exposure dose for each component is calculated, the components can be arranged in descending order of exposure dose and displayed together with the exposure dose in the 12c of the region on the screen. In addition, when the distribution of the exposure dose on the substrate is displayed in the region 12b, by displaying the image of the substrate in an overlapping manner, it is possible to visually confirm the relationship between the components mounted on the substrate and the distribution of the exposure dose.

As described above, the exposure dose calculation unit 50 of the control unit 10 calculates the exposure dose of the inspection object in the inspection, so that the exposure dose of the inspection object can be estimated in advance before the inspection object is actually irradiated with X-rays (before the inspection). The user can set the imaging conditions that provide the optimum exposure dose by repeating the process of setting predetermined imaging conditions (as described above, the number of transmission images taken for CT calculation, tube voltage, tube current, exposure time, magnification ratio, etc.), calculating the exposure dose, displaying it on the monitor 12, changing the imaging conditions in consideration of image quality and tact time, calculating the exposure dose again, and displaying it on the monitor 12.

The invention claimed is:

1. An inspection device that inspects an inspection object by changing a relative position of a radiation source and the inspection object, irradiating the inspection object with a radiation from the radiation source, and acquiring an image of the inspection object, the inspection device comprising:
    an information storage that stores, as a reference dose, a dose from the radiation source irradiated on a predetermined position with respect to the radiation source; and
    a calculator that calculates the dose irradiated on the inspection object in the inspection,
    the calculator executing:
        before the inspection object is inspected, based on inspection information of the inspection object in the inspection, an imaging condition, and a moving route including an imaging position on the inspection object, in any period from a start to an end of the inspection,
        a first step of calculating, based on the reference dose stored in the information storage, from the relative positions of the radiation source and the inspection object in a period in which the image is acquired in the imaging position while the relative positions of the radiation source and the inspection object are fixed of changed, an estimated value of the dose irradiated on the inspection object;
        a second step of calculating, based on the reference dose stored in the information storage, from the relative positions of the radiation source and the inspection object in a period in which the relative positions of the radiation source and the inspection object are changed and the imaging position is moved, an estimated value of the dose irradiated on the inspection object;
        a third step of calculating a total value of the estimated values of the doses irradiated on the inspection object from a total of the estimated value of the dose calculated in the first step and the estimated value of the dose calculated in the second step; and
        a fourth step of outputting the total value calculated in the third step.

2. The inspection device according to claim 1, wherein the information storage stores information concerning a characteristic of the radiation source, and
    when calculating the estimated values of the doses irradiated on the inspection object in the first step and the second step, the calculator corrects the dose calculated based on the information concerning the characteristic of the radiation source stored in the information storage.

3. The inspection device according to claim 2, wherein in the first step and the second step, the calculator divides an entire region of the inspection object into a plurality of partial regions and calculates the estimated value of the doses for each of the partial regions, and
    in the third step, the calculator calculates the total value for each of the partial regions.

4. The inspection device according to claim 3, wherein in the fourth step, the calculator outputs as an image, a distribution of the total value of the estimated values of the doses.

5. The inspection device according to claim 4, wherein the information storage stores information concerning components attached to the inspection object, and
    in the fourth step, the calculator outputs, based on the information concerning the components stored in the information storage, the total value for each component from the partial regions in a position of the component.

6. The inspection device according to claim 5, wherein, in the fourth step, the calculator outputs as an image, based on the inspection information, the positions of the components and the distribution of the total value of the doses irradiated on the components in association with each other.

7. The inspection device according to claim 3, wherein the information storage stores information concerning components attached to the inspection object, and
    in the fourth step, the calculator outputs, based on the information concerning the components stored in the information storage, the total value for each component from the partial regions in a position of the component.

8. The inspection device according to claim 7, wherein, in the fourth step, the calculator outputs as an image, based on the inspection information, the positions of the components and the distribution of the total value of the doses irradiated on the components in association with each other.

9. The inspection device according to claim 1, wherein in the first step and the second step, the calculator divides an entire region of the inspection object into a plurality of partial regions and calculates the estimated value of the doses for each of the partial regions, and
    in the third step, the calculator calculates the total value for each of the partial regions.

10. The inspection device according to claim 6, wherein in the fourth step, the calculator outputs as an image, a distribution of the total value of the estimated values of the doses.

11. The inspection device according to claim 10, wherein the information storage stores information concerning components attached to the inspection object, and
    in the fourth step, the calculator outputs, based on the information concerning the components stored in the information storage, the total value for each component from the partial regions in a position of the component.

12. The inspection device according to claim 11, wherein, in the fourth step, the calculator outputs as an image, based on the inspection information, the positions of the components and the distribution of the total value of the doses irradiated on the components in association with each other.

13. The inspection device according to claim 9, wherein the information storage stores information concerning components attached to the inspection object, and
    in the fourth step, the calculator outputs, based on the information concerning the components stored in the information storage, the total value for each component from the partial regions in a position of the component.

14. The inspection device according to claim 13, wherein, in the fourth step, the calculator outputs as an image, based on the inspection information, the positions of the components and the distribution of the total value of the doses irradiated on the components in association with each other.

15. The inspection device according to claim 1, wherein the calculator changes the imaging condition and executes the first step to the fourth step.

* * * * *